United States Patent

[11] 3,559,950

[72] Inventor Donald R. Nelson
  Worcester,, Mass.
[21] Appl. No. 684,708
[22] Filed Nov. 21, 1967
[45] Patented Feb. 2, 1971
[73] Assignee Goddard Industries, Inc.
  Worcester, Mass.
  a corporation of Massachusetts

[54] VALVE
  4 Claims, 2 Drawing Figs.
[52] U.S. Cl. .................................................. 251/214,
  277/110, 277/125
[51] Int. Cl. ....................................................... F16k 41/04
[50] Field of Search .......................................... 251/84, 86,
  214, 357; 277/123, 124, 125, 126, 129, 227, 233,
  235, 110

[56] References Cited
UNITED STATES PATENTS
2,254,209 9/1941 Buttner et al. ................. 251/357UX
3,284,089 11/1966 Wrenshall ..................... 251/214X
1,165,197 12/1915 Marsh .......................... 251/86
2,718,373 9/1955 Henry ........................... 251/86X
FOREIGN PATENTS
729,482 3/1966 Canada ......................... 277/125

Primary Examiner—William F. O'Dea
Assistant Examiner—David R. Matthews
Attorney—Wolf, Greenfield and Hieken ABSTRACT: A globe valve adapted for use at cryogenic temperatures having a valve seat in the valve body adapted to be closed by a conical seat disc. The seat disc is supported for vertical movement in a seat holder having a downwardly flared peripheral flange rolled about the seat disc periphery. The holder is carried by an elongated stem which extends through the valve bonnet. The stem and bonnet are sealed by a series of compressed Teflon and brass rings concentric with and between the upper end of the valve bonnet and the stem. The rings are axially compressed between a flange formed in the valve bonnet and a sleeve follower which in turn is secured by a packing nut with a washer between one end of the packing nut and the sleeve follower.

VALVE

BACKGROUND OF THE INVENTION

The present invention relates to a valve and, in particular, to a globe valve especially designed for use at cryogenic temperatures.

Valves designed for use at cryogenic temperatures present peculiar problems which are not readily solved by using conventional technology that is suitable for valves used at ambient temperatures. The problems of designing cryogenic valves are substantial because of the special problems presented in operating valves at cryogenic temperatures and because of the peculiar nature of fluids in this temperature range. At cryogenic temperatures, significant problems are introduced in valve design by several factors including substantial shrinkage of the materials involved and by the increased likelihood of leakage through relatively minute openings or seams. Because of these design problems, cryogenic valves are comparatively expensive and difficult to design for satisfactory operation over a variety of sizes and parameters. It is therefore an object of the present invention to provide a relatively inexpensive cryogenic valve design that is capable of being embodied in valves of a variety of different sizes that will operate satisfactorily over a wide range of cryogenic temperatures without likelihood of failing.

SUMMARY OF THE INVENTION

The present invention is embodied in a cryogenic valve having a valve or body and a bonnet with a passage extending through the body and a valve seat intermediate the ends of the passage. A stem extends through a cylindrical opening in the bonnet and it supports a unique seat disc holder. A seat disc is supported on the holder for axial movement to and away from engagement with the valve seat. The seat disc is preferably formed with a continuous surface adapted to be engaged within its periphery by the valve seat whereby closure of the seat disc over the valve forms a continuous, integral closure. The seat disc holder is provided with depending flanges inwardly flared at their ends and engaging the seat disc at its periphery only so that there is no through opening extending through the surface of the seat disc. The stem is sealed within the body by a plurality of coaxial, alternating metal and plastic rings. There rings are compressed within the cylindrical opening of the bonnet between a packing sleeve follower and means projecting from the cylindrical opening in the bonnet. Preferably, the plastic rings are of greater diameter than the metal rings and are compressed with sufficient force to flow about or extend laterally over the peripheral outer surface of the metal rings thereby effecting a better seal at cryogenic temperatures.

BRIEF DESCRIPTION OF THE DRAWINGS

The foregoing objects and advantages of the present invention will be more clearly understood when considered in conjunction with the accompanying drawings in which.

DESCRIPTION OF THE PREFERRED EMBODIMENT

Figure 1:
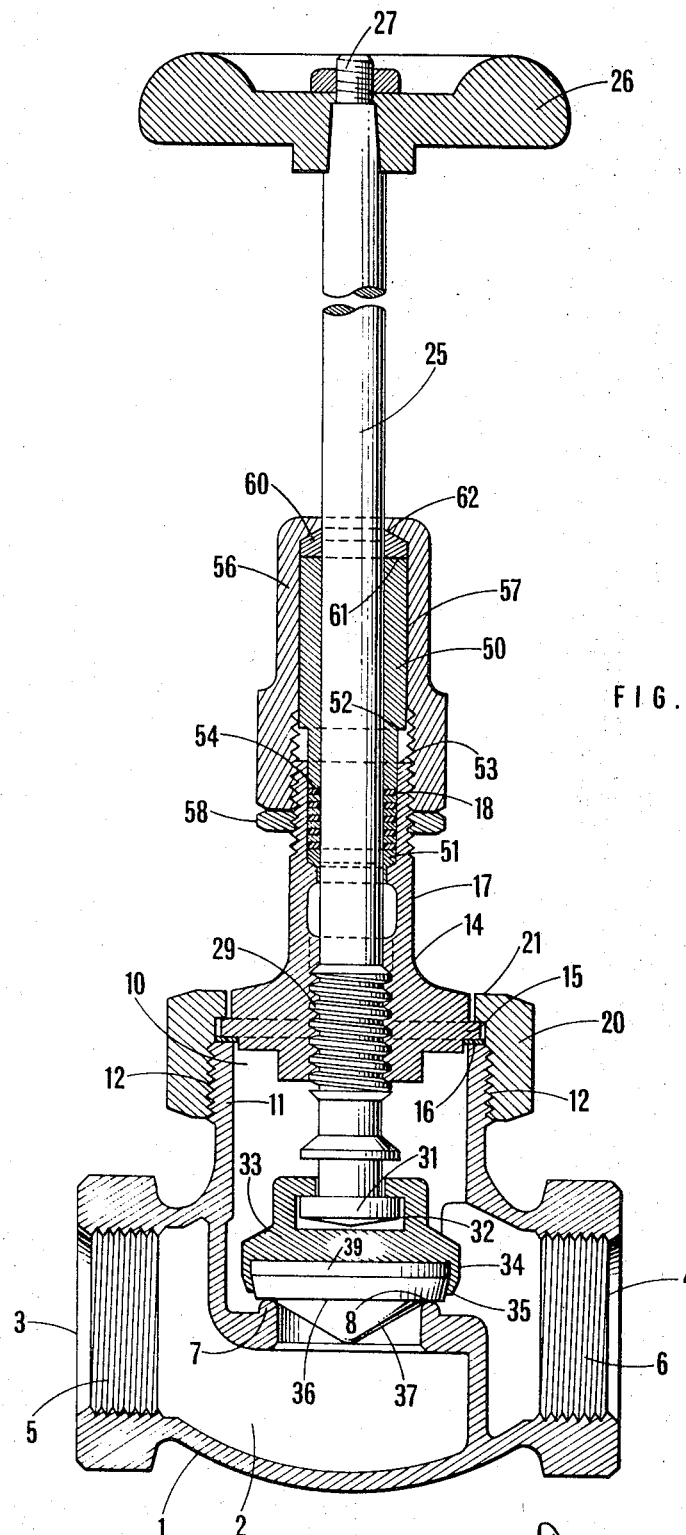
FIG. 1 is a vertical, cross-sectional elevation of a globe valve embodying the invention.

Referring to the drawings, there is illustrated a cryogenic globe valve which embodies the present invention. In this arrangement the valve body 1 is formed as an integral unit having a passage 2 extending through it. This passage is formed with open ends 3 and 4. These ends 3 and 4 are parallel with one another and are preferably coaxially aligned. The ends 3 and 4 may be suitably threaded as illustrated at 5 and 6, for interengagement with other cryogenic plumbing. An annular valve seat 7 is formed intermediate the ends of the passage 2 with this valve seat having an upper surface 8 that lies in a plane preferably perpendicular to the planes in which the ends of the passage 2 lie.

The upper end of the body 1 is preferably formed with a relatively wide opening 10, defined by an upper cylindrical wall 11 of the body externally threaded at 12. A bonnet 14 preferably of the same metal material as the body 1, has its lower end positioned within the opening 10. The lower end of the bonnet 14 is formed with an outwardly extending, peripheral flange 15 that is adapted to engage the upper surface of the cylindrical wall 11. Preferably, an annular gasket 16 of plastic material, such for example as Teflon or Kel-F, is positioned between the upper surface of the annular wall 11 and the lower periphery of the flange 15. The bonnet 14 is formed with an upwardly extending, cylindrical neck 17 that defines a cylindrical opening. The bonnet 14 is secured to the annular wall 11 of the body by a bonnet ring 20 which has an inwardly extending, annular flange 21 that engages the upper surface of the flange 15 and has an internally threaded surface that engages the threads 12 formed on the wall 11.

A stem 25 extends vertically through the bonnet 14 into the interior of the body 1. This stem has a conventional ring or handle 26 secured at its upper end by a bolt 27. The stem 25 is of substantial length for cryogenic purposes, and has approximately one-half of its length exposed. The lower end of the stem 25 is threaded, as illustrated at 29, with this threaded section 29 threadingly engaging an internally threaded opening extends axially through the bonnet 14. The lower end of the stem 25 is formed with a laterally extending flange 31 which is adapted to loosely engage an inverted, T-shaped slot 32 in the valve seat disc holder 33. This valve seat disc holder 33 is formed with a downwardly extending, annular, peripheral flange 34 that engages the outer periphery of the seat disc 36 outwardly of the valve seat surface 8. The lower extremities 35 of this flange 34 are flared inwardly to firmly engage the undercut periphery of the disc 36. The disc 36 is preferably formed of a plastic material such as Kel-F or Teflon, and has a solid, continuous, conical, lower surface 37 that extends outwardly beyond the annular surface 8 of the valve seat 7. The upper end 39 of the disc 36 has a diameter greater than the the diameter of the annular surface 8. The periphery of this upper end 39 is undercut or recessed to provide an annular, engaging surface for the lower extremities 35 of the annular flange 34. The rolled, inwardly flared flange 34 which secures the disc to the lower surface of the disc holder eliminates leakage paths by avoiding studs that extend through the disc. This arrangement also avoids stud breakage, which is common in conventional cryogenic valves. The conical surface 37 provides a throttlelike effect between the disc and valve seat and thereby affords an improved closure control for the valve.

Occasionally, fluids will collect between the upper surface of disc 36 and the facing surface of the disc holder 33. To avoid damage on temperature cycling, a vent means may be provided. This may take the form of a hole extending axially through the holder 33 upwardly from the disc 36, or a groove extending diametrically across the lower surface of the holder and continuously downwardly on the inner surface of flange 34. A groove might also be formed across the top and down the upper end 39 of disc 36.

Figure 2:
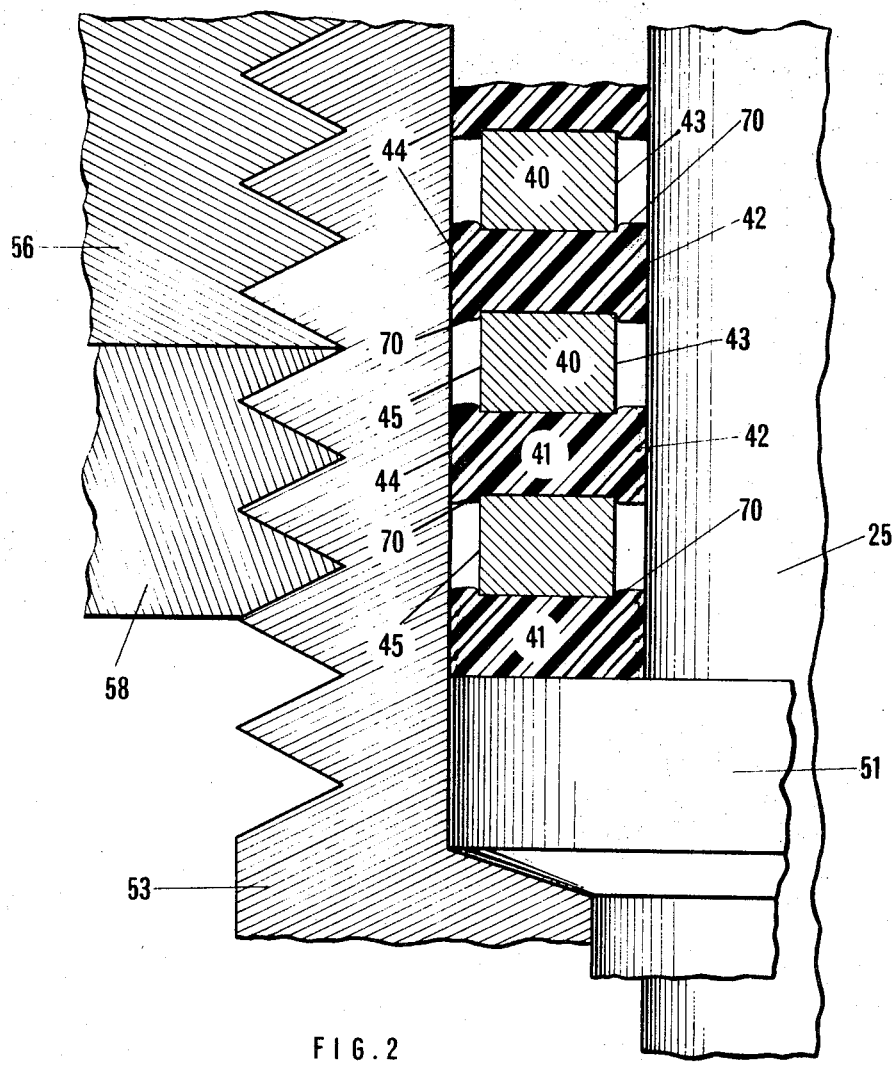
FIG. 2 is an enlarged cross section of the embodiment of FIG. 1 showing a detail thereof.

The plurality of rings illustrated at 18 are best illustrated in the enlarged detail of FIG. 2. In this arrangement, the rings are formed of alternate metal, preferably brass, rings 40, and plastic, preferably Teflon, rings 41. The plastic rings 41 have an inner peripheral surface 42 which is smaller than the inner peripheral surface 43 of the metal rings 40. The plastic Teflon rings 41 have an outer, peripheral surface 44, which is preferably greater than the outer, peripheral surface 45 of the brass rings. These rings are maintained under compression by the packing sleeve follower 50 which maintains an axial force in a direction toward the annular, brass, lower adapter 51. The packing sleeve follower 50 is a cylindrical member having a shoulder section 52 that is adapted to move towards interengagement with the upper end 53 of the neck 17. The packing sleeve follower 50 fits snugly about the surface of the stem 25 and is maintained in compressive relation at its lower end 54 by the packing nut 56 which is coaxial with the stem 25 and packing sleeve follower 50. The nut 56 has an open, lower end which is internally threaded and engages complementary threads on the outer surface of the neck 17 at its upper end. If desired, the outer surface at this lower end of the packing nut may have a hexagonal configuration. A lock nut 58 is tightened against the lower end of the packing nut 56. The inner, cylindrical surface 57 of the packing nut 56 fits in snug facing relation with the outer, cylindrical surface of the packing sleeve follower 50. A washer 60 is positioned coaxial with the stem 25 between the upper end 61 of the packing sleeve follower and the inner surface of the upper end 62 of the packing nut. Preferably, the upper surface of the packing nut is beveled as illustrated. This washer 60 fits tightly about and acts as a bearing for lateral support of the stem 25. The washer 60 is compressed between the packing nut 56 and the packing sleeve follower 50 to provide a moisture seal in the valve when it operates at relatively low temperatures, or at ambient temperatures.

The rings generally illustrated at 18 are preferably formed by compressing or compacting them by closing the packing sleeve follower 50 and packing nut downwardly towards the bonnet 14 with sufficient force to cause the outer periphery of the Teflon rings 41 to partially flow around or over the peripheral outer surfaces 45 of the metal rings 40. At both ambient and cryogenic temperatures, the outer surfaces 44 of the plastic rings engage the inner surface of neck 17 and the inner surface 42 engages the surface of stem 25. Thus, the upper and lower surfaces of the plastic rings are multiplaner with portions of these surfaces engaging the side and peripheral outer surface of the metal rings. It is believed that this overhang, as illustrated at 70, effects a better seal when the valve is operated at cryogenic temperatures. It is theorized that the shrinkage ordinarily associated with these plastic rings at cryogenic temperatures is minimized because the contraction of the plastic is resisted in the projecting portions 70 by the resistance or backing effect of the outer surface of the metal rings.

The washer 60 is made of a suitable plastic, such as Teflon or Kel-F.

I claim:

1. A globe valve for use at cryogenic temperatures comprising a valve body having a passage extending therethrough with a valve seat intermediate the ends of the passage, a bonnet having a cylindrical opening secured to said body, an elongated stem extending through said cylindrical opening and supporting at one end a seat disc holder with a seat disc therein within said body for axial movement to and away from said valve seat, a plurality of alternating metal and plastic rings coaxial with said stem and positioned in said cylindrical opening, means for maintaining said plurality of rings under compressive force including means at one end interengaging said bonnet with said plurality of rings and a sleeve follower coaxial with said stem at the other end, a packing nut coaxial with and engaging said sleeve follower and adjustably interengaged with said bonnet and a washer coaxial with said stem and positioned between corresponding ends of said sleeve follower and said packing nut providing lateral support for said stem and a moisture barrier between said packing nut and stem.

2. A valve as set forth in claim 1 wherein said means at one end comprises an inwardly flared flange in said cylindrical opening forming a constriction therein, a lower adapter coaxial with said stem having its periphery supported on said inwardly flared flange and engaging one end of said plurality of rings.

3. A valve as set forth in claim 1 wherein said seat disc has a continuous surface adapted to be engaged within its periphery by said valve seat whereby closure of the said seat disc over said valve seat forms a continuous and integral closure over said valve seat, said seat disc holder having depending flanges inwardly flared and engaging said seat disc at its periphery with means interengaging said seat disc holder and said one end of said stem, and means forming a venting passage between said seat disc and said seat disc holder.

4. A valve as set forth in claim 1 wherein said plastic rings have an outer periphery greater than the outer periphery of said metal rings.